Patented Mar. 2, 1954

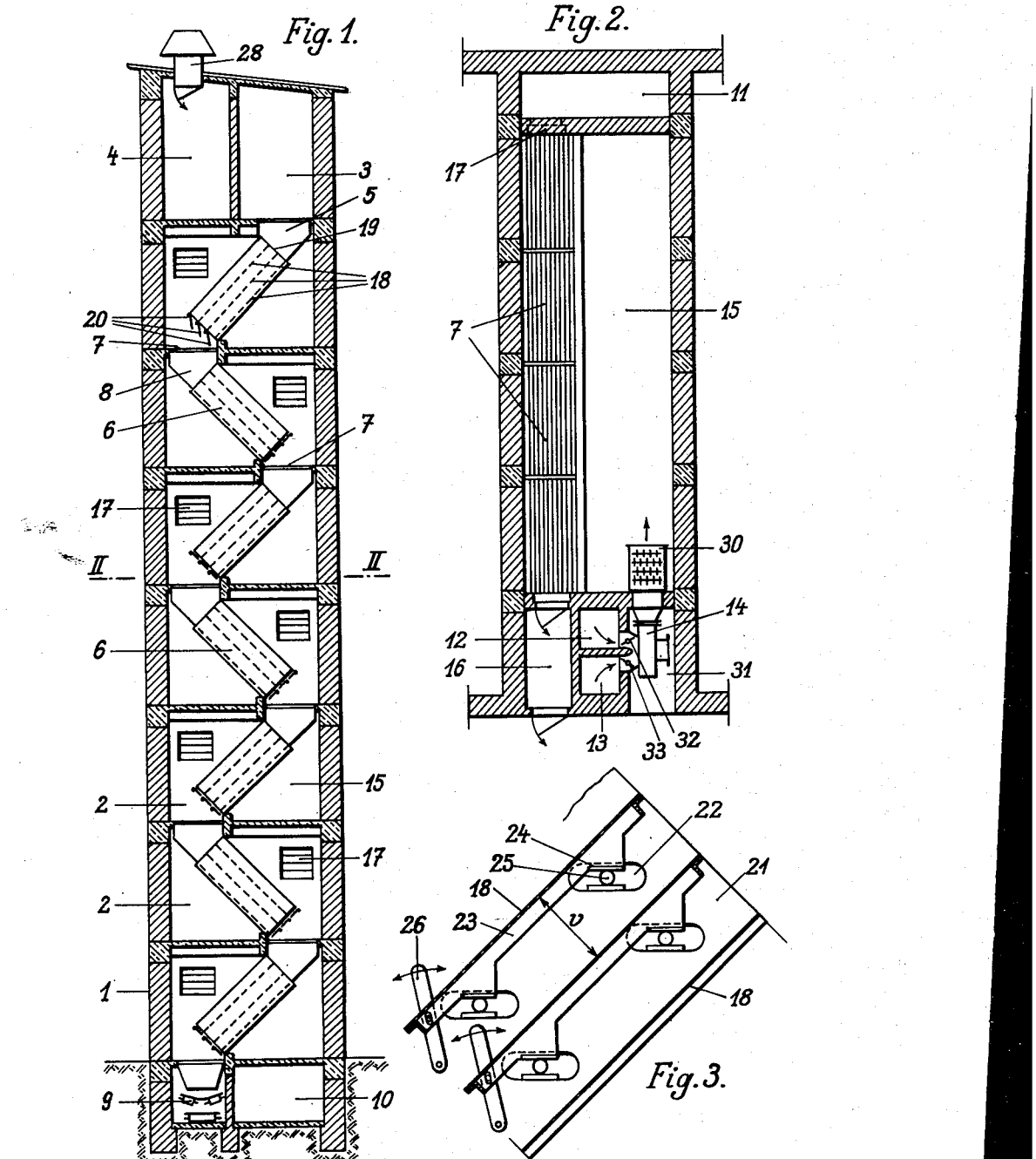

2,671,045

UNITED STATES PATENT OFFICE 2,671,045

PRODUCTION OF GREEN MALT

Mojmír Růžička, Brno, Czechoslovakia

Application September 11, 1948, Serial No. 48,891

6 Claims. (Cl. 195—129)

This invention relates to the production of green malt in pneumatic germinating boxes and aims more particularly at effecting an automatic and gentle rearrangement in layers of the malt, such as could hitherto only be carried out on malting floors and by expert manual labor, so-called turning. The pneumatic germinating boxes for the production of green malt, as hitherto used, carried out the turning over of the layers of the germinating heap by means of mechanical turning-over devices which required a considerable amount of power for driving them, damaged the germinating grain and did not effect an actual turning of the layers, but only a thorough mixing of the heap. Hitherto the emptying of the germinating box has been very difficult and has usually been carried out with the aid of pneumatic conveying means which are costly in operation.

According to the invention the production of green malt is carried out in germinating boxes which are disposed one above the other and in which the box bottoms are in any inclined up to a vertical position. This arrangement enables the germinating heap to descend from the higher lying box to the one lying next below it without the expenditure of any energy. If, according to a further feature of this invention, the arrangement be also made such that the inclination of each box be the reverse of that of the box above it, then during the descent of the layers of germinating malt they will also be turned over. In this method the grain is very gently treated and there can be no danger of mechanical damage, such as occurred in the methods hitherto used.

According to a further feature of the invention the germinating heap is subdivided in the individual boxes with advantage into several layers which are allowed to descend independently and in any desired sequence into the next following box, so that not only the sequence of the layers can be altered, but the individual layers can also be turned. Through this arrangement the same conditions are realized as with expert manual work on the malt floor with the aid of shovels and consequently the same favorable conditions as regards yield and quality of the malting process. According to the new method those conditions are realized, while employing the pneumatic malting process and retaining the advantages of that process, that is to say, less space required and no manual work in turning the material.

The invention also relates to the arrangement for carrying out this new malting process, which, owing to its construction, presents still further advantages, such as the possibility of providing the air conditions best suited for the malting process, suitable means for conveying the grain to the individual germinating boxes and means for conveying the green malt away from the last germinating box. These details and further advantages of the invention shall now be decribed with reference to the accompanying drawing.

Figure 1 of the drawing shows a vertical section through a structure of several stories with inclined pneumatic germinating boxes disposed one above the other, Figure 2 is the plan view of the germinating box in section II—II of Figure 1, and Figure 3 shows a detail of the arrangement of the movable partitions, that is, the bottoms of one box.

The structure 1 contains a series of stories, the number of which corresponds to the desired number of germinating boxes. In the uppermost story 3 are the return air duct 4 and a chamber for the wet-heap basket or chute 5. In the other stories are the germinating boxes which are arranged at an inclination and have their lower side wall aiming at the opening in the floor of each story, leading to the next story and provided with a grid 7. In each successive story the inclination of the box 6 is opposite to that of the preceding box, the upper, open side wall 19 of the box being disposed below the grid-covered opening 7. Below this opening is a chute 8 for conveying the grain, as it descends, into the next following box. Below the outlet opening of the last box is a mechanical conveyor 9. Below the last story there is also a second return air duct 10 which like the upper duct 4 is in communication with a vertical shaft 11 lying behind the boxes. In front of the boxes are two vertical shafts 12 and 13, shaft 12 for the circulating air and shaft 13 for fresh air. From these shafts an independent fan 14 in a chamber 31 draws by suction for each box chamber circulation and fresh air in any proportion regulable by clack valves 32, 33, respectively and forces it through moistening arrangements of the usual kind schematically indicated at 30, into the space 15 of triangular section below the lowest perforated bottom of the individual boxes. Disposed in front of the boxes is an admission passage 16 with two doors, these passages being suitably placed on the side of the shafts 12 and 13 opposite to that provided with the fan, the arrangement being such that with each story the disposition of the side passage and of the fan chamber alternates. In the opposite wall of each story is the air escape opening 17 with the vertical shaft 11.

As seen in section in Figure 1, each box is provided with three air-pervious, practically parallel bottoms 18. The upper end 19 is open, whereas the lower side wall is provided with flaps 20 corresponding in number to the division of the boxes into layers, these flaps being regulable from the manipulation stages with grids 7. The manner of support of the separate perforated bottoms or wall members 18 of the box, the distance between which is adjustable, is shown diagrammatically in Figure 3. The bottoms 18 rest on fixed partitions 21, the outline of which corresponds to the cross-section of the boxes and in which are cut horizontal guides 22. On the frames 23 of the individual bottoms are provided corresponding horizontal off-set portions 24 which enable the bottoms to rest on balls 25. These off-sets at the same time limit the freedom of motion in the guides 22. The separate movable supporting bottoms are provided with levers 26 at the lower part of the solid side walls of the box provided with doors 20, by means of which levers motion can be imparted to the perforated bottoms, when adjusting the layers or emptying the boxes. Instead of a hand-operated lever 26 a pneumatic or electric vibrator may be used. These will come into action during the sliding down motion of the layers, greatly assisting the motion of the germinating grain.

In carrying out the process according to the invention the softened barley is pumped from the steeping tub into the wet-couch basket 5 above the first box, where the water drips down and the couch dries off. At a given time the wet couch is let out of the said basket into the first box 6 which is fitted with partitions 18. Each such compartment will then carry a layer and this layer is arrested at the lower side of the box by a flap valve 20. The germinating grain then remains in each box for the predetermined period and is thereupon discharged into the next following box. When transferring the grain, various methods may be adopted. For instance, the valve of the top layer may be first opened, so that this layer will slide down as the first layer into the lower box, thus being deposited on the lowest perforated bottom of this box. Thereupon the middle or the lowest layer may follow, the last layer forming the top layer of the box being charged. Through the separate layers sliding down on to the bottoms of the next following box with its opposite inclination, not only are the layers of germinating grain shuffled, but a turning of the separate layers is also effected with a simultaneous loosening of the germinating grain as it runs through the grids 7.

Corresponding to the increasing volume of the germinating piles the basic distances apart of the individual compartments of each successive box are increased. The adjustment of these distances can be made use of when passing the grain from one box to the next, for this motion of the individual bottoms assists the automatic emptying of the boxes after the opening of the outlet flaps 20.

An equivalent arrangement is one in which the bottoms of the lower boxes are given a greater superficial area, and all the layers in all the boxes have the same height, in order to allow for the increasing volume of the germinating grain.

The vertical air escape shaft 11 common to all the boxes enables the heavy carbon dioxide to accumulate in the bottom return air duct 10 and air with a considerably lower carbon dioxide content to be withdrawn at 28 from the upper return air duct 4. The carbon dioxide thus obtained and the heat of vegetation can be utilized directly in the box for controlling the growth and thereby giving the malt increased tenderness and improving the enzymatic action.

Through the utilization of the free fall and the possibility of erecting partitions in the separate boxes all arrangements for turning the heaps, as used in the known germinating boxes with horizontal bottoms, are done away with and it becomes possible to turn the individual layers and to shuffle the layers in any way without injuring grain or radicles in an entirely automatic manner and without any running costs. Through separating the germinating grain into layers the influence of the weight of the upper layers on the lower ones is also done away with, which was not possible in the germinating boxes hitherto in use.

The illustrated constructional form of an arrangement for carrying out the malting process only represents an example of how the invention may be put into effect and many modifications of constructional details are, of course, possible without departing from the spirit of the invention.

I claim:

1. In an apparatus for producing green malt, in combination, a plurality of superposed, vertically spaced boxes each comprising a pair of horizontally spaced side walls, said side walls between them defining a space for the temporary storage of germinating substance, a plurality of substantially parallel, air-pervious, inclined wall members extending between and secured to said side walls, thereby subdividing said space into a plurality of compartments, said wall members forming individual supports for germinating substance present in respective ones of said compartments, and closure means for temporarily closing the lower end of each compartment, the wall members of alternate boxes being inclined in opposite directions.

2. The combination according to claim 1, including mounting means for said wall members enabling parallel displacement thereof along said side walls.

3. The combination according to claim 2, including operating means for effecting the said parallel displacement of individual ones of said wall members.

4. The combination according to claim 1, including an exhaust shaft communicating with said boxes on one side thereof, air supply means communicating with said boxes on the other side thereof, a first feed channel for said air supply means communicating with the atmosphere, a second feed channel for said air supply means communicating with said exhaust shaft, and valve means controlling the proportion of fresh air and exhaust air fed to said air supply means by way of said first and said second feed channel, respectively.

5. The combination according to claim 4 wherein said air supply means comprises a plurality of blowers adjacent respective ones of said boxes, said valve means comprising independently adjustable valves for separately regulating the proportion of fresh air and exhaust air for each of said blowers.

6. In an apparatus for producing green malt, in combination, a box assembly comprising a pair of horizontally spaced side walls between them defining a space for the temporary storage of germinating substance, a plurality of substantially parallel, air-pervious, inclined wall members extending between and secured to said side walls, thereby subdividing said space into a plurality of compartments, said wall members forming individual supports for germinating substance present in respective ones of said compartments, and closure means for temporarily closing the lower end of each compartment; and mechanism enabling parallel displacement of individual ones of said wall members while leaving unchanged the inclination thereof, said mechanism including a set of guide elements on said side walls and a set of co-operating projections on said individual ones of said wall members supported by respective ones of said guide elements for translatory movement relative thereto.

MOJMÍR RŮŽIČKA.

References Cited in the file of this patent

UNITED STATES PATENTS

| Number | Name | Date |
|---|---|---|
| 272,257 | Howe | Feb. 13, 1883 |
| 437,950 | Toepfer | Oct. 7, 1890 |
| 672,843 | Renner | Apr. 23, 1901 |
| 936,011 | Meyer | Oct. 5, 1909 |
| 998,027 | Meyer | July 18, 1911 |
| 1,399,797 | Rotsted | Dec. 13, 1921 |
| 1,462,621 | Pfeiffer | July 24, 1923 |

FOREIGN PATENTS

| Number | Country | Date |
|---|---|---|
| 26,823 | Germany | of 1882 |
| 43,655 | Germany | of 1887 |